April 12, 1927.
P. A. HASSELBLATT
1,624,241
HEAT RETAINER
Filed Nov. 10, 1924    2 Sheets-Sheet 1
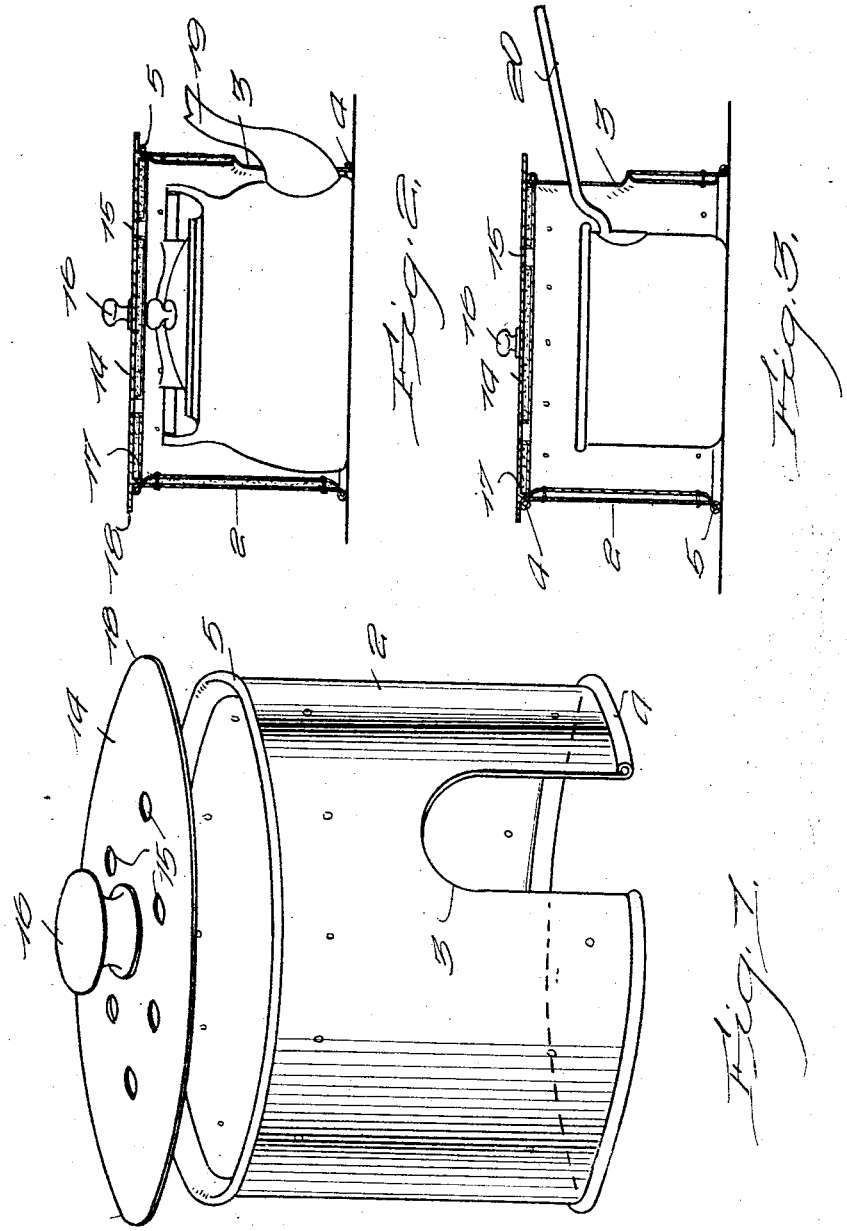
Inventor
Paul A. Hasselblatt

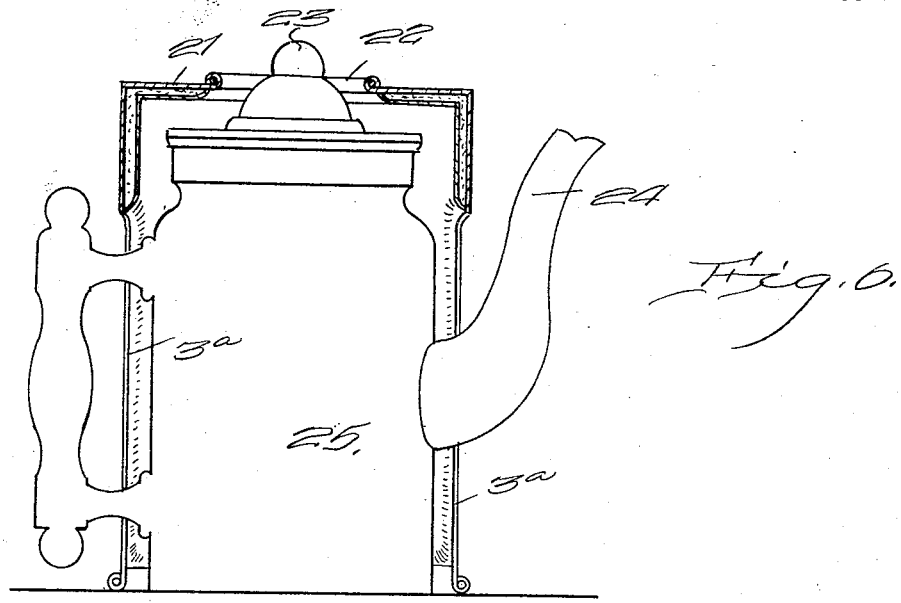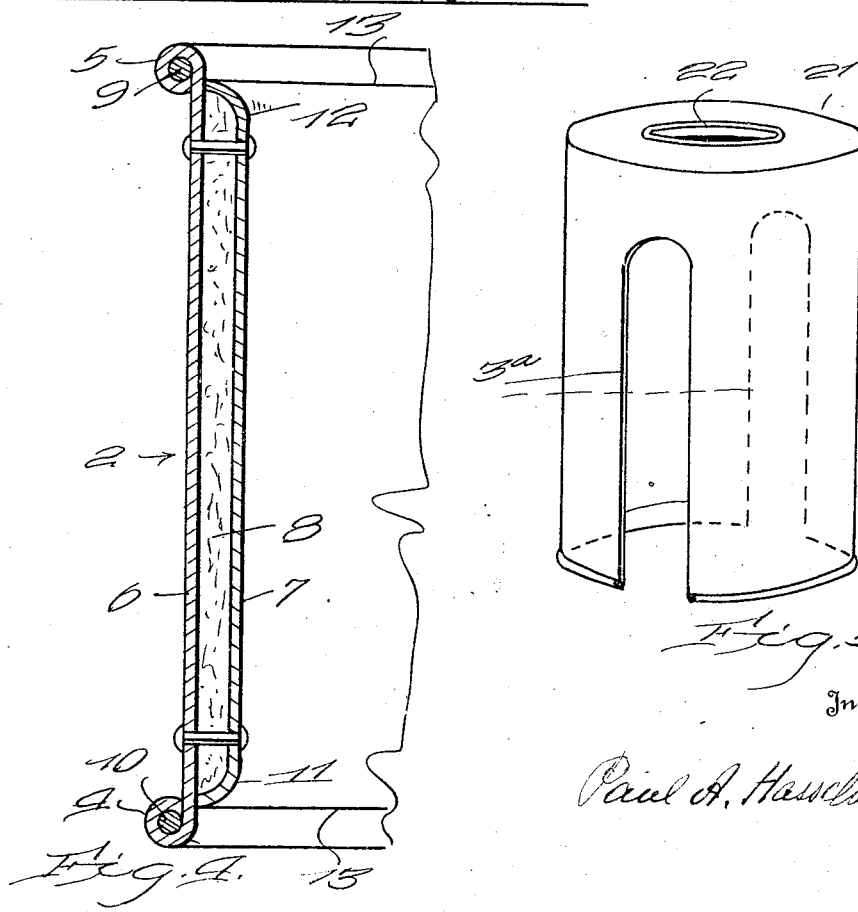

Patented Apr. 12, 1927.

1,624,241

UNITED STATES PATENT OFFICE.

PAUL A. HASSELBLATT, OF BROOKLYN, NEW YORK.

HEAT RETAINER.

Application filed November 10, 1924. Serial No. 748,991.

This invention relates to utensil covers, and particularly to cooking utensil covers.

An object of this invention is to provide a cover for kitchen utensils, which may be used for various types of cooking utensils and is universal in its nature, in order to conserve the heat in the utensil and around the utensil both during the cooking operation and after the utensil has been removed from the fire.

With the foregoing and other objects in view I have invented the device shown in the accompany drawings, in which:—

Figure 1 is a perspective of my device.

Figure 2 is a section through my device as mounted around a tea kettle.

Figure 3 is a like view to Figure 2 as mounted around a stew pan.

Figure 4 is a fragmentary vertical section of the drum part of my device.

Figure 5 is a perspective of a modification.

Figure 6 is a section of the modification shown in Figure 5, mounted over a coffee percolator.

Like reference characters indicate like parts throughout the several views of the drawings and in the specification, in which I provide a drum 2 open at both ends, and having a door or side opening 3, the ends of the drum being preferably curled at 4 and 5, and the walls of the drum made of separate sheets 6 and 7 carrying an asbestos or other suitable insulating lining 8 the sheet being curled over forming the ends 4 and 5, which carry respectively wire cores 9 and 10. The ends of the wall 7 bend outwardly at 11 and 12, forming shoulders 13. Fitting upon the shoulders 13 is a cover 14 perforated at 15, and provided with a knob 16 and with a shoulder 17, the shoulder 17 adapted to fit upon the shoulder 13 at either end of the drum against the walls 11 and 12, with the outer flanged edge 18 of the cover fitting over the curls 4 and 5, making the cover 14 interchangeable from one end of the drum to the other. Therefore when over a tea kettle as shown in Figure 2, the opening 3 fits over the nozzle 19 of the tea kettle. When on the other hand it is used in conjunction with a stew pan as shown in Figure 3, the drum is reversed, that is upside down relative to the position shown in Figure 2, and the opening 3 being at the top provides for the handle 20 of the stew pan.

In the modification shown in Figure 5 I provide a solid top 21 with a relatively longer opening $3^a$, the top 21 being provided with an aperture 22 to accommodate a percolator top such as 23, and the opening $3^a$ being suitable for accommodating a spout such as 24 for a coffee urn or tea pot, or other utensil such as 25.

Claim.

A kitchen utensil comprising a cylindrical member formed of inner and outer spaced walls of sheet metal, the edges of the inner wall being curled outwardly and engaged with the edges of the outer wall, insulating material disposed in the space between the walls of said member, said member being cut inwardly from one end thereof to provide a longitudinal opening therein adapted to receive therethrough projecting portions of utensils over which said member may be applied, said member being also capable of reversal to position the opening at the top or bottom thereof, and a cover for one end of said cylindrical member provided with a plurality of openings, as and for the purposes described.

In testimony whereof I affix my signature.

PAUL A. HASSELBLATT.